(12) United States Patent
Horikawa et al.

(10) Patent No.: US 8,839,919 B2
(45) Date of Patent: *Sep. 23, 2014

(54) SHOCK ABSORBER

(75) Inventors: Akiyoshi Horikawa, Tokyo (JP); Yuta Ohmura, Tokyo (JP)

(73) Assignee: Koganei Corporation, Tokyo (JP)

( * ) Notice: Subject to any disclaimer, the term of this patent is extended or adjusted under 35 U.S.C. 154(b) by 125 days.

This patent is subject to a terminal disclaimer.

(21) Appl. No.: 13/566,396

(22) Filed: Aug. 3, 2012

(65) Prior Publication Data

US 2012/0326367 A1    Dec. 27, 2012

Related U.S. Application Data (63) Continuation of application No. 11/712,670, filed on Mar. 1, 2007, now Pat. No. 8,342,301.

(30) Foreign Application Priority Data

Mar. 2, 2006    (JP) .................................. 2006-56031
Feb. 26, 2007   (JP) .................................. 2007-45770

(51) Int. Cl.
| | |
|---|---|
| F16D 57/00 | (2006.01) |
| F16F 9/32 | (2006.01) |
| F16F 9/18 | (2006.01) |
| F15B 15/22 | (2006.01) |
| F16M 3/00 | (2006.01) |

(52) U.S. Cl.
CPC ................. *F16F 9/18* (2013.01); *F16F 9/3242* (2013.01); *F15B 15/228* (2013.01)
USPC ...... 188/266; 188/312; 188/316; 188/322.18; 267/136

(58) Field of Classification Search
USPC ......... 188/266, 281, 286–288, 312, 313, 316, 188/322.13, 322.15, 322.18; 267/124, 137, 267/226, 136

See application file for complete search history.

(56) References Cited

U.S. PATENT DOCUMENTS

| | | | | |
|---|---|---|---|---|
| 2,905,458 | A | * | 9/1959 | Mason .......................... 267/128 |
| 2,948,358 | A | * | 8/1960 | Born et al. .................... 188/287 |
| 3,889,934 | A | * | 6/1975 | Kamman ........................ 267/34 |
| 5,137,124 | A | * | 8/1992 | Wirges ....................... 188/282.1 |
| 5,228,640 | A | * | 7/1993 | Mouille ..................... 244/17.27 |
| 8,342,301 | B2 | * | 1/2013 | Horikawa et al. ............. 188/312 |
| 8,584,817 | B2 | * | 11/2013 | Horikawa et al. ............. 188/287 |

FOREIGN PATENT DOCUMENTS

| | | | | |
|---|---|---|---|---|
| JP | 1141245 | A | * | 6/1989 |
| JP | 2125118 | A | * | 5/1990 |

* cited by examiner

*Primary Examiner* — Melody Burch
(74) *Attorney, Agent, or Firm* — McCormick, Paulding & Huber, LLP (57) ABSTRACT

A shock absorber is attached coaxially with a reciprocating rod driven by a reciprocating unit for absorbing an impact force without bending the reciprocating rod. The shock absorber has a hollow rod provided with a through hole. The hollow rod is mounted within an outer cylindrical body. An accommodating space is formed between the hollow rod and the outer cylindrical body. A spring force toward one end portion side of the hollow rod is applied to the outer cylindrical body by a compression coil spring. An annular piston provided in the hollow rod partitions the accommodating space into two liquid chambers. When the impact force is applied to the hollow rod, the liquid flows from one liquid chamber to another liquid chamber through a gap, whereby a resistance force is applied to the hollow rod.

2 Claims, 8 Drawing Sheets

Figure 11:
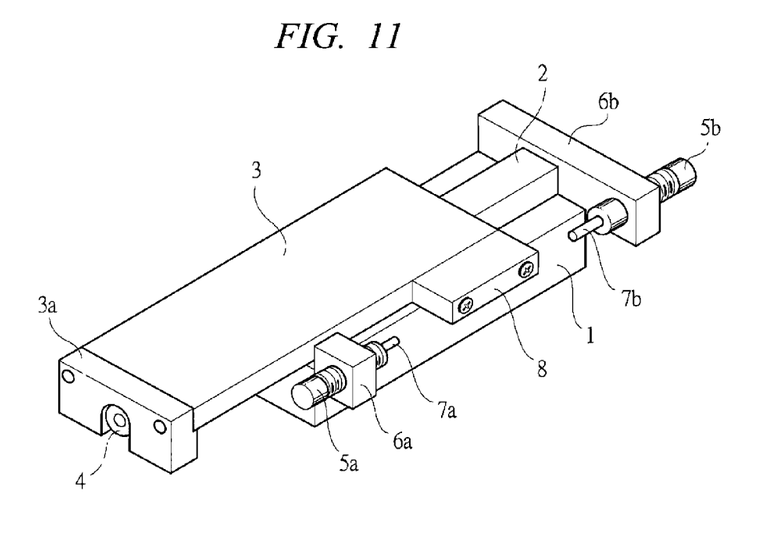
FIG. 11 is a perspective view showing a conventional pneumatic cylinder including a cylinder main body and a reciprocating table which is reciprocably mounted on a guide rail provided to the cylinder main body.

FIG. 12 the reciprocating rod 4, shock absorbers 5*a* and 5*b* are attached to the cylinder main body 1 through brackets 6*a* and 6*b* in order to absorb the impact force at the stroke end of the reciprocating rod 4 or reciprocating table 3, and a stopper 8 with which the rods 7*a* and 7*b* of the shock absorbers 5*a* and 5*b* collide is attached to the reciprocating table 3.

SHOCK ABSORBER

CROSS-REFERENCE TO RELATED APPLICATIONS

This application is a Continuation of U.S. patent application Ser. No. 11/712,670, filed on Mar. 1, 2007. Applicant hereby claims foreign priority benefits under U.S.C. §119 from Japanese Patent Applications No. 2006-56031 filed on Mar. 2, 2006 and No. 2007-45770 filed on Feb. 26, 2007, the contents of which are incorporated by reference herein.

TECHNICAL FIELD OF THE INVENTION

The present invention relates to a shock absorber for decreasing an impact force of a moving member in stopping the moving member.

BACKGROUND OF THE INVENTION

In a fluid pressure cylinder which drives a reciprocating rod, that is, a piston rod by hydraulic pressure or pneumatic pressure, when the reciprocating rod is stopped at a stroke end of the reciprocating rod, an impact force is applied to the reciprocating rod and a moving member such as a member to be driven by the reciprocating rod. To decrease the impact force, a buffer such as a resin-made damper, air cushion, hydraulic cushion, shock absorber is used so that the moving member collides with a member on a fixing side through the buffer.

For example, when an electronic component or jig is carried with a reciprocating rod of a pneumatic cylinder, unless any buffer is provided to the pneumatic cylinder, a product to be carried such as the electronic component, namely, a member to be driven receives the impact force at the stroke end of the reciprocating rod. As a result, not only the product to be carried is moved to an unexpected place or damaged or dropped but also a large vibration occurs, thereby shortening a lifetime of the pneumatic cylinder or an electronic-component manufacturing apparatus including the same. To decrease such an impact force at the stroke end, the aforementioned buffer is provided to the pneumatic cylinder. If carrying speed is reduced without providing the buffer in order to prevent the product to be carried from dropping, an operating ratio of the electronic-component manufacturing apparatus drops. If a member for securely fixing the product to be carried to the moving member is used, an entire structure of the apparatus is made large.

The shock absorber as a buffer is often used to stop the product to be carried moving at high speed or to stop movement of a heavy product to be carried. The shock absorber includes one of a type of making a rod protrude from an end portion of a cylindrical case (see Patent Document 1: Japanese Utility Model Laid-Open Publication No. 61-55530).

To use the shock absorber of such a type to absorb the impact force at the stroke end of the reciprocating rod driven by the pneumatic cylinder, the shock absorber is attached to a side face of a cylinder main body while a stopper with which the rod of the shock absorber collides is attached to the reciprocating rod.

FIG. 11 is a perspective view showing a conventional slide table type pneumatic cylinder, which includes a cylinder main body 1 and a reciprocating table 3 mounted reciprocably to a guide rail 2 provided to the body. As shown in FIG. 11, in a pneumatic cylinder in which a reciprocating rod 4 provided to the cylinder main body 1 is connected to the reciprocating table 3 through a linking member 3*a* so as to drive the recip- Also, if the shock absorbers 5*a* and 5*b* are attached to the reciprocating table 3, the stopper with which the rods 7*a* and 7*b* of the shock absorbers 5*a* and 5*b* collide is to be attached to the cylinder main body 1. In any case, the rods 7*a* and 7*b* absorb the impact force of the reciprocating table 3 while moving and retracting into cylindrical cases of the shock absorbers 5*a* and 5*b*.

In the shock absorber of such a type, the cylindrical case is filled with fluid such as silicone oil, and a spring or the like for returning, to an original position, the rod moved and retracted at a time of collision is incorporated in the cylindrical case.

SUMMARY OF THE INVENTION

In the case where a conventional shock absorber is used to absorb the impact force of the reciprocating unit such as the pneumatic cylinder, even if the shock absorber is attached to the cylinder main body or to the reciprocating table in an above-mentioned manner, the shock absorber is attached apart from an axial center of the cylinder main body. For this reason, the shock absorber has been attached at a position protruding from a side face or upper face of the reciprocating table or at a position protruding from a side face of the pneumatic cylinder.

Thus, since the shock absorber absorbs the impact force at a position offset from the axial center of the pneumatic cylinder, a bending moment is applied to the reciprocating table and the reciprocating rod in absorbing the impact force and so the bending moment is applied also to a guide rail which supports the reciprocating table. Accordingly, strength of the cylinder main body, reciprocating table and guide rail needs to be increased.

As shown in FIG. 11, if the shock absorbers 5*a* and 5*b* are attached to the cylinder main body 1, the stopper 8 which collides with the rods 7*a* and 7*b* needs to be attached to the reciprocating table 3. If the shock absorber is attached to the reciprocating table, the stopper which collides with the rods needs to be attached to the cylinder main body. Thus, the number of parts constituting the pneumatic cylinder increases and concurrently a size of the apparatus is made large. Further, if the stopper is attached to the reciprocating rod and the shock absorber is attached to an outer face of the cylinder main body, a rotation stopper for the reciprocating rod needs to be provided to the cylinder main body so that the reciprocating rod collides with the rods of the shock absorber.

Meanwhile, in order to dispose the shock absorber coaxially with the reciprocating rod so that no bending moment is applied to the reciprocating rod of the pneumatic cylinder at a time of absorbing the impact force, it is necessary to attach a fixing jig such as a bracket to the cylinder main body and attach the shock absorber to the cylinder main body through the fixing jig. Therefore, since the fixing jig protrudes from a periphery of the cylinder main body, space efficiency in the cylinder main body is bad.

An object of the present invention is to dispose a shock absorber coaxially with a reciprocating rod driven by a reciprocating unit such as a pneumatic cylinder so as to apply no bending moment to the reciprocating rod in absorbing an impact force.

Another object of the present invention is to dispose the shock absorber coaxially with the reciprocating rod and attach the shock absorber directly to a reciprocating unit main body, thereby eliminating a stopper which collides with the shock absorber and reducing a manufacture cost of the reciprocating unit.

Still another object of the present invention is to dispose the shock absorber coaxially with the reciprocating rod to save a space on a periphery of the reciprocating unit.

Yet still another object of the present invention is to be capable of adjusting a stroke of the reciprocating rod by adjusting an axial attaching position of the shock absorber with respect to the reciprocating rod.

A shock absorber according to the present invention decreases an impact force at a time of stopping a reciprocating rod provided to a reciprocating unit main body, the shock absorber comprising: a hollow rod having a through hole formed for passing through the reciprocating rod and mounted axially relatively to the reciprocating rod; an outer cylindrical body mounted outside and coaxially with the hollow rod so as to be movable axially relatively to the hollow rod, the outer cylindrical body being provided with an attaching portion to be attached to the reciprocating unit main body; an annular piston provided outside the hollow rod, partitioning a liquid accommodating space formed between the hollow rod and the outer cylindrical body into a first liquid chamber and a second liquid chamber, and applying a resistance force to a flow of the liquid from the first liquid chamber to the second liquid chamber at a time of an impact-force absorption movement of the hollow rod to the outer cylindrical body; and a restoring means provided in the first liquid chamber and restoring the hollow rod to an original position located before an impact-force absorption.

The shock absorber according to the present invention further comprises: the annular piston provided integrally outside the hollow rod; and a gap formed between an inner circumferential face of the outer cylindrical body and the annular piston to communicate with the first liquid chamber and the second liquid chamber.

The shock absorber according to the present invention further comprises: a check valve provided in the annular piston to permit the flow of the liquid from the second liquid chamber to the first liquid chamber and blocking the flow of the liquid from the first liquid chamber to the second liquid chamber.

The shock absorber according to the present invention further comprises: the annular piston provided outside the hollow rod so as to be slidable axially with respect to the hollow rod; an outside gap for applying a resistance force to the flow of the liquid from the first liquid chamber to the second liquid chamber, the outside gap being formed between an outer circumferential face of the annular piston and an inner circumferential face of the outer cylindrical body; and an inside gap for guiding the liquid from the second liquid chamber to the first liquid chamber together with the outside gap, the inside gap being formed between an inner circumferential face of the annular piston and an outer circumferential face of the hollow rod, and the inside gap being larger in size than the outside gap.

The shock absorber according to the present invention is such that the attaching portion is a male screw to be screwed to the reciprocating unit main body.

The shock absorber according to the present invention is such that the attaching portion is a bracket to be fixed to the reciprocating unit main body.

The shock absorber decreases an impact force at a time of stopping a reciprocating rod provided to a reciprocating unit main body, the shock absorber comprising: a hollow rod having a through hole formed for passing through the reciprocating rod and mounted axially relatively to the reciprocating rod; an outer cylindrical body mounted outside and coaxially with the hollow rod so as to be movable axially relatively to the hollow rod, the outer cylindrical body being provided with an attaching portion to be attached to the reciprocating unit main body; an intermediate cylindrical body formed inside the outer cylindrical body and forming a communicating gap between the outer cylindrical body and the intermediate cylindrical body; an annular piston provided outside the hollow rod so as to be slidable on an inner circumferential face of the intermediate cylindrical body, the annular piston partitioning a liquid accumulating space formed between the hollow rod and the outer cylindrical body into a first liquid chamber and a second liquid chamber; an orifice formed in the intermediate cylindrical body and decreasing a communicating area between the communicating gap and the first liquid chamber in accordance with an impact-force absorption movement of the hollow rod to the outer cylindrical body; and a restoring means provided in the first liquid chamber and restoring the hollow rod to an original position located before an impact-force absorption.

The shock absorber according to the present invention further comprises: the annular piston provided integrally outside the hollow rod; and a check valve provided in the annular piston, permitting the flow of the liquid from the second liquid chamber to the first liquid chamber, and blocking the flow of the liquid from the first liquid chamber to the second liquid chamber.

The shock absorber according to the present invention further comprises: an accumulator incorporated in the second liquid chamber to absorb the liquid.

According to the present invention, the shock absorber comprises the hollow rod and the outer cylindrical body coaxial therewith, wherein the reciprocating rod passes through the hollow rod and the outer cylindrical body is attached to the reciprocating unit main body. Therefore, when the impact force applied to the hollow rod is absorbed at a stroke end of the reciprocating rod, no bending moment is applied to the reciprocating rod from the shock absorber. Thus, it is unnecessary to enhance rigidity and/or strength of the reciprocating unit main body such as a pneumatic cylinder and/or of any members driven by it, and therefore a reduction in size and weight of the reciprocating unit can be achieved.

According to the present invention, since the shock absorber is disposed coaxially with the reciprocating rod, it is unnecessary to attach, to the reciprocating unit, any members for attaching the shock absorber to the reciprocating unit main body and/or to the stopper with which the rod of the shock absorber collides. Therefore, the manufacture cost of the reciprocating unit can be reduced and simultaneously a space surrounding the reciprocating unit is effectively available.

According to the present invention, since the outer cylindrical body is provided with the male screw and screwed to the reciprocating unit main body, an axial position of the shock absorber with respect to the reciprocating unit can be adjusted. Consequently, the stroke of the reciprocating rod can be adjusted easily.

Because the shock absorber of the present invention is disposed coaxially with the reciprocating rod of the pneumatic cylinder, it can absorb the impact force even if the reciprocating rod rotates.

DESCRIPTION OF THE PREFERRED EMBODIMENTS

Figure 1:
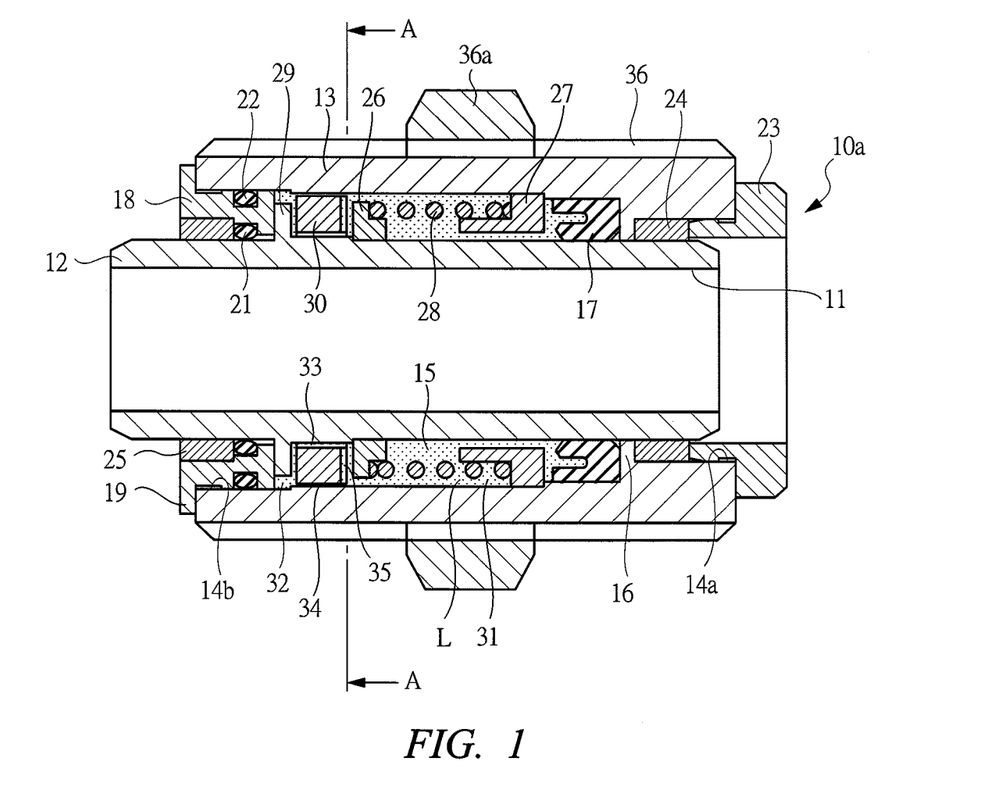
FIG. 1 is a sectional view showing an inoperative condition of a shock absorber according to an embodiment of the present invention.
Figure 2:
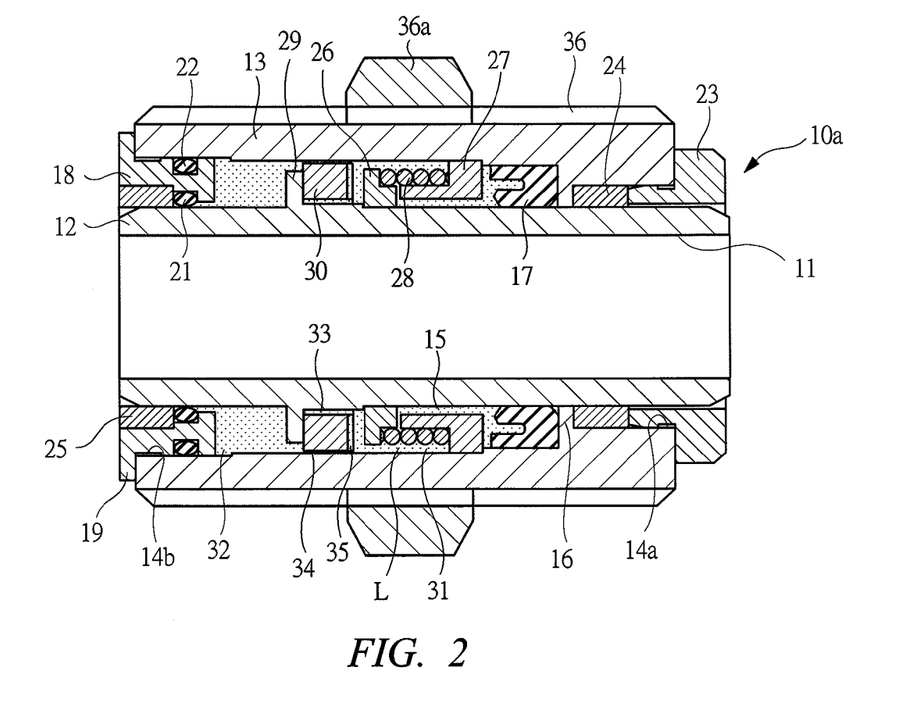
FIG. 2 is a sectional view showing an operative condition of the shock absorber shown in FIG. 1.
Figure 3:
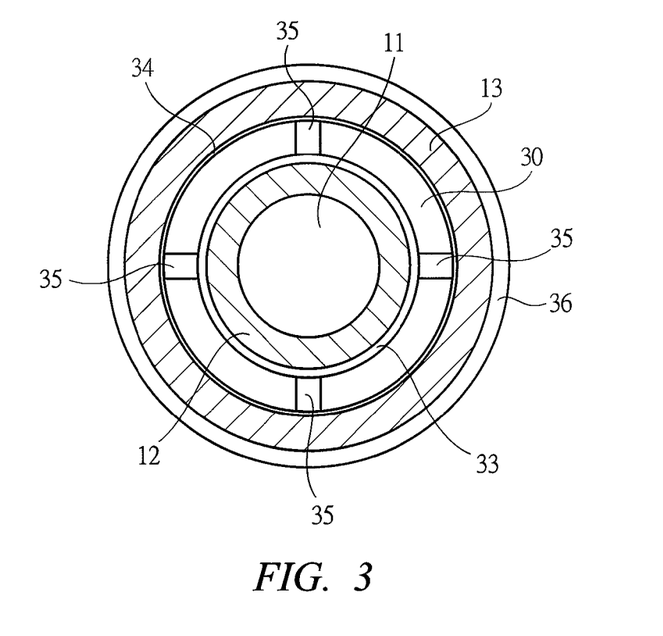
FIG. 3 is a sectional view taken along line A-A in FIG. 1.

Hereinafter, embodiments of the present invention will be described in detail with reference to the accompanying drawings. FIGS. 1 and 2 are sectional views showing a shock absorber according to an embodiment of the present invention. FIG. 1 shows an inoperative condition of the shock absorber, and FIG. 2 shows an operative condition of the shock absorber. FIG. 3 is a sectional view taken along line A-A in FIG. 1.

As shown in FIGS. 1 and 2, this shock absorber 10a includes: a hollow rod 12 at a center of which a through hole 11 is formed; and an outer cylindrical body 13 mounted outside the hollow rod 12 so as to be movable axially relatively to the hollow rod 12. Opening portions 14a and 14b are provided in both end portions of the outer cylindrical body 13, and the hollow rod 12 is movable axially relatively to the outer cylindrical body 13 so as to pass through an interior of the outer cylindrical body 13. In this shock absorber 10a, the outer cylindrical body 13 is attached to a pneumatic cylinder as a reciprocating unit, and a piston rod, that is, a reciprocating rod incorporated in the pneumatic cylinder passes through the through hole 11 of the hollow rod 12.

An inner diameter of the outer cylindrical body 13 is larger in some portions than an outer diameter of the hollow rod 12, and an accommodating space 15 for accommodating liquid is formed between an outer circumferential face of the hollow rod 12 and an inner circumferential face of the outer cylindrical body 13 so that silicone oil denoted as liquid L can be accommodated in this accommodating space 15. A stopper 16 is formed at an end portion of the outer cylindrical body 13 integrally with the outer cylindrical body 13 so as to protrude in an inner-radial direction, and a rod packing 17 is incorporated as a sealing material in an inner axial side of the stopper 16 in order to prevent an external leakage of the liquid L between the outer cylindrical body 13 and the hollow rod 12. A ring-like plug 18 is installed in an opening portion 14b located at the other end portion of the outer cylindrical body 13. A flange 19 which abuts on an end face of the outer cylindrical body 13 is provided to this plug 18, and an O-ring 21 for preventing the external leakage of the liquid L between the plug 18 and the hollow rod 12, and an O-ring 22 for preventing the external leakage of the liquid L between the plug 18 and the outer cylindrical body 13 are incorporated respectively as sealing materials in annular grooves provided in the plug 18. The plug 18 is press-fitted or screwed to the outer cylindrical body 13, thereby becoming integral with the outer cylindrical body 13.

An annular stopper ring 23 is fixed to the opening portion 14a of the outer cylindrical body 13, a collar 24 is fitted between the stopper ring 23 and the stopper 16, and a collar 25 is fitted inside the plug 18. Therefore, the outer circumferential face of the hollow rod 12 makes a sliding contact with inner circumferential faces of the collars 24 and 25.

An annular spring receiver 26 is fixed outside the hollow rod 12 so as to abut on a radial-directional step formed on an outer face of the hollow rod 12, and an annular spring receiver 27 as opposed to the spring receiver 26 is fixed inside the outer cylindrical body 13 so as to abut on a radial-directional step formed on an inner face of the outer cylindrical body 13. A compression coil spring 28 serving as a restoring means is incorporated between the spring receivers 26 and 27 so as to be located in the accommodating space 15 between the hollow rod 12 and the outer cylindrical body 13. A spring force is applied to the outer cylindrical body 13 by the compression coil spring 28 in such a restoration direction as to direct the outer cylindrical body 13 toward an end portion side of the hollow rod 12, that is, a right end portion side in FIGS. 1 and 2. At this time, a spring force is applied to the hollow rod 12 in such a restoration direction as to direct the hollow rod 12 toward the other end portion side of the outer cylindrical body 13, that is, a left end portion side in FIGS. 1 and 2. Thus, the spring forces are applied to the hollow rod 12 and the outer cylindrical body 13 in opposite axial directions to each other.

A stopper 29 is provided to the hollow rod 12 so as to protrude outward from the outer circumferential face thereof, and a position under a relative movement limit in mutual opposite directions of the hollow rod 12 and the outer cylindrical body 13 by the compression coil spring 28 is restricted by abutment on the stopper 29 and the plug 18.

An annular piston 30 is disposed between the stopper 29 and the spring receiver 26, and the accommodating space 15 is partitioned by the annular piston 30 into a first liquid chamber 31 as a spring chamber which accommodates the compression coil spring 28 and a second liquid chamber 32 located on a side of the opening portion 14b of the outer cylindrical body 13. The annular piston 30 is disposed in the accommodating space 15 in a floating state in which the annular piston 30 does not contact with the hollow rod 12 nor contact with the outer cylindrical body 13. Within a sliding stroke of the annular piston 30 with respect to the hollow rod 12 and the outer cylindrical body 13, an inner diameter of the annular piston 30 is set larger than an outer diameter of the hollow rod 12 while an outer diameter of the annular piston 30 is set smaller than an inner diameter of the outer cylindrical body 13. By doing so, an inside gap 33 for guiding the liquid is formed between an inner face of the annular piston 30 and an outer face of the hollow rod 12, and an outside gap 34 for guiding the liquid is formed between an outer face of the annular piston 30 and an inner face of the outer cylindrical body 13. Consequently, the first liquid chamber 31 and the second liquid chamber 32 communicate with each other through the gaps 33 and 34.

A radial dimension of the inside gap 33 is set larger than that of the outside gap 34, so that the gap 33 is made wide while the gap 34 is made narrow. As shown in FIG. 3, a plurality of slits 35 extending radially are formed in an inside end face of the annular piston 30, that is, an end face opposing the spring receiver 26, so that the liquid L flows into the gap 33 through the slits 35 even when the inside end face of the annular piston 30 contacts with the spring receiver 26.

Therefore, when no impact force is applied as an external force to the shock absorber 10a as shown in FIG. 1, that is, when the shock absorber is in an inoperative condition, the outer cylindrical body 13 is moved by a spring force of the compression coil spring 28 toward the right end portion side of the hollow rod 12 up to a movement limit position where the stopper 29 and the plug 18 abut on each other with respect to the hollow rod 12 as shown in FIG. 1. At this time, the hollow rod 12 is moved toward the left end portion side of the outer cylindrical body 13 up to a movement limit position with respect to the outer cylindrical body 13. When the shock absorber 10a becomes in the inoperative condition as described above and the outer cylindrical body 13 is moved on the right end portion side of the hollow rod 12, lengths of the hollow rod 12 and the outer cylindrical body 13 are set so that the stopper ring 23 of the outer cylindrical body 13 becomes a projection end portion protruding from the right end portion of the hollow rod 12 and the left end portion of the hollow rod 12 becomes a projection end portion protruding from the left end portion of the outer cylindrical body 13.

In the case as shown in FIGS. 1 and 2, the entire length of the hollow rod 12 is set to be substantially the same length as that of the outer cylindrical body 13 including the stopper ring 23. Under the inoperative condition of the shock absorber 10a shown in FIG. 1, the left end portion of the hollow rod 12 protrudes larger in an outer axial direction than the left end portion of the outer cylindrical body 13. Under an operative completion condition of the shock absorber 10a shown in FIG. 2, a left end face of the hollow rod 12 coincides with a left end face of the outer cylindrical body 13, and a right end face of the hollow rod 12 substantially coincides with an end face of the stopper ring 23 located at the end portion of the outer cylindrical body 13. However, under the operative completion condition shown in FIG. 2, even if the right end face of the hollow rod 12 as shown in FIG. 1 is not located at such a position as to be substantially coincide with the end face of the stopper ring 23, the hollow rod 12 may be set to have such length as to be disposed on an inner axial side or outer axial side of the above-mentioned position.

Meanwhile, as shown in FIG. 2, when a colliding member 57 (shown for example in FIGS. 7, 8, and 10) collides with the left end face of the hollow rod 12 and an external force is applied to the hollow rod 12, the hollow rod 12 is slid axially against a spring force and a resistance force as described later with respect to the cylindrical body 13 attached to the reciprocating unit. Then, the end face of the hollow rod 12 is moved until it coincides with the end face of the plug 18 attached to the end portion of the outer cylindrical body 13. In this movement process, the annular piston 30 is moved together with the hollow rod 12 in a state of being pushed by a flow of the liquid L to abut on the stopper 29. In this movement process, impact force energy applied to the outer cylindrical body 13 and the hollow rod 12 is absorbed by the spring force and the resistance force as described later. Simultaneously, the liquid L flows from the first liquid chamber 31 to the second liquid chamber 32 through the narrow outside gap 34. The resistance force is applied by the gap 34 to a flow of the liquid L entering the second liquid chamber 32, whereby a resistance force is applied to a relative movement of the hollow rod 12 to the outer cylindrical body 13. Consequently, the impact force transmitted from the outer cylindrical body 13 to the hollow rod 12 due to a collision of the colliding member 57 with the outer cylindrical body 13 is decreased. Also, in this movement process, no gap exists between the annular piston 30 and the stopper 29 because the annular piston 30 is pressed by the flow of the liquid L and tightly contacted to the stopper 29. Therefore, the liquid L does not flow through the inside gap 33 but flows through the narrow outside gap 34.

When the collision of the colliding member with 57 the shock absorber 10a is released, an axial relative position between the outer cylindrical body 13 and the hollow rod 12 is returned by the spring force from the operative condition shown in FIG. 2 to the inoperative condition shown in FIG. 1. In this movement process, the annular piston 30 is moved to a side of the spring receiver 26 by the liquid L flowing from the second liquid chamber 32 to the first liquid chamber 31. Thus, the annular piston 30 leaves the stopper 29, and is pushed by the spring receiver 26 to move toward the left end portion side of the outer cylindrical body 13. At this time, the liquid L flows from the second liquid chamber 32 into the first liquid chamber 31 through the outside gap 34 and the inside gap 33 and slits 35, so that the resistance force as large as the one when the annular piston 30 is shifted from the inoperative condition to the operative condition is not applied to the annular piston 30, whereby restoration from the operative condition to the inoperative condition becomes prompt.

Thus, by forming the gaps 33 and 34 inside and outside the annular piston 30, each of which has a different radial dimension, and by making the annular piston 30 in a floating condition, the annular piston 30 is allowed to have a difference between the resistance force applied by the liquid L at a time of movement of the annular piston 30 from the inoperative condition to the operative condition and the resistance force at a time of reverse movement to it. However, the annular piston 30 may be fixed to the outer circumferential face of the hollow rod 12 without providing the inside gap 33. In this case, the resistance force applied to the annular piston 30 can be provided with any difference by forming a hole in an axial direction of the annular piston 30 and incorporating a check valve in the hole in the same manner as described in the drawings. Further, it is permissible to make the end force of the compression coil spring 28 abut on the annular piston 30 by mounting the compression coil spring 28 between the spring receiver 27 and the annular piston 30 without providing the spring receiver 26.

As described above, the hollow rod 12 passes through and is installed within the outer cylindrical body 13. Therefore, when the shock absorber 10a is operated, the hollow rod 12 is moved relatively to the outer cylindrical body 13 until the left end face of the hollow rod 12 coincides with the end face of the plug 18, and then the left end portion of the hollow rod 12 is relatively moved to enter into the left end portion of the outer cylindrical body 13. As a result, volume of the accommodating space 15 is constant and remains unchanged even if the relative axial position between the hollow rod 12 and the outer cylindrical body 13 is moved to any position. Thus, the volume of the accommodating space 15 does not change when the hollow rod 12 is moved axially relatively.

A male screw 36 to which a nut 36a is screwed is formed on the outer circumferential face of the outer cylindrical body 13. Under the condition in which the reciprocating rod of the pneumatic cylinder serving as a reciprocating unit passes through the hollow rod 12, the shock absorber 10a can be attached to a pneumatic cylinder by screwing the male screw 36 to the pneumatic cylinder. Further, because the shock absorber 10a is attached to the reciprocating unit through the male screw 36, a stroke of the reciprocating rod can be adjusted easily.

Figure 4:
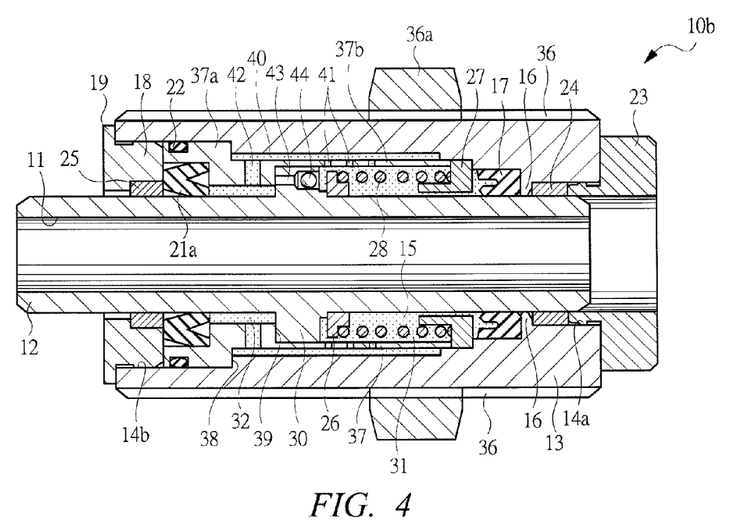
FIG. 4 is a sectional view showing a shock absorber according to another embodiment of the present invention.
Figure 5:
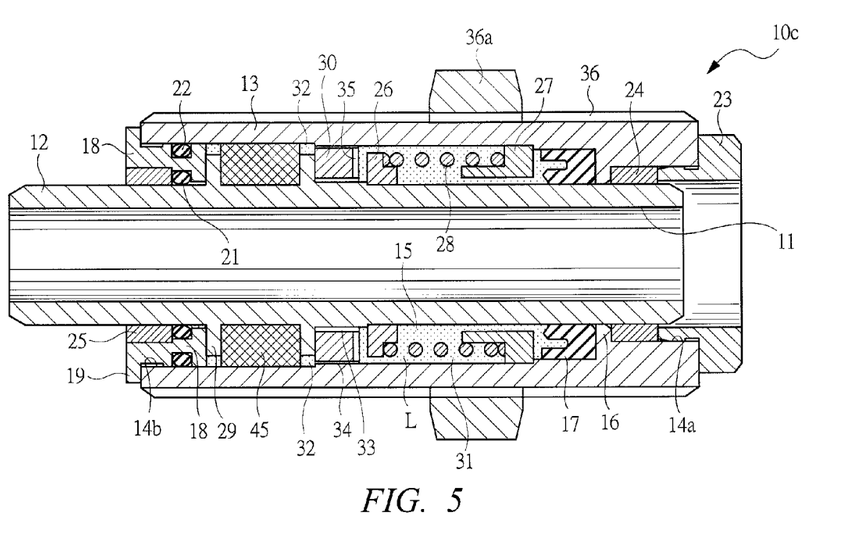
FIG. 5 is a sectional view showing a shock absorber according to still another embodiment of the present invention.
Figure 6:
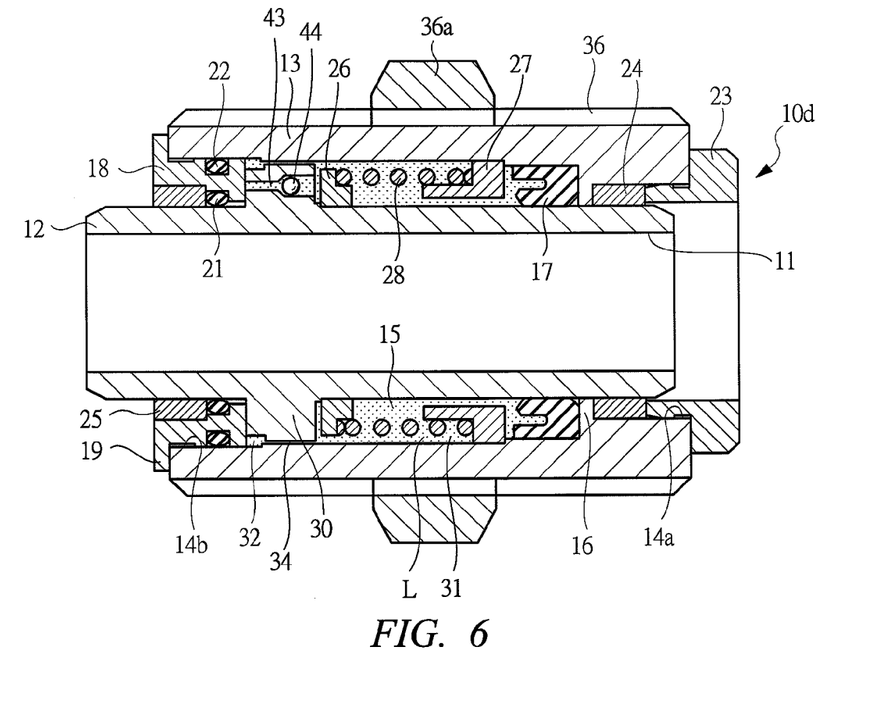
FIG. 6 is a sectional view showing a shock absorber according to still another embodiment of the present invention.

FIG. 4 is a sectional view showing a shock absorber 10b according to another embodiment of the present invention; FIG. 5 is a sectional view showing a shock absorber 10c according to still another embodiment of the present invention; and FIG. 6 is a sectional view showing a shock absorber 10d according to the still another embodiment of the present invention. Respective basic structures of the shock absorbers 10b to 10d are the same as that shown in FIGS. 1 and 2. In FIGS. 4 to 6, members having functions common to the members shown in FIGS. 1 and 2 are denoted by the same reference numerals.

In the shock absorber 10b shown in FIG. 4, the annular piston 30 is provided integrally with the hollow rod 12, and an intermediate cylindrical body 37 is fixed inside the outer cylindrical body 13. This intermediate cylindrical body 37 has a cylindrical base portion 37a in which an abutting portion 38 abutting on a radial step formed on a side of the opening portion 14b of the outer cylindrical body 13 is formed and a stopper face 39 on which the annular piston 30 abuts is formed. A tubular guide portion 37b extending toward the opening portion 14a is provided integrally with the base portion 37a. The outer circumferential face of the annular piston 30 contacts with the inner circumferential face of the guide portion 37b, so that the annular piston 30 contacts with the inner circumferential face of the guide portion 37b and is guided by the guide portion and moved axially.

The intermediate cylindrical body 37 partitions the accommodating space 15 into a first and second liquid chambers 31 and 32 together with the annular piston 30 which contacts with the inner circumferential face of the intermediate cylindrical body 37, and a communicating gap 40 which communicates with the two liquid chambers 31 and 32 is formed between the intermediate cylindrical body 37 and the outer cylindrical body 13. A plurality of orifices 41 which communicate with the first liquid chamber 31 and the communicating gap 40 are formed in the guide portion 37b in the form of through holes in order to make the two liquid chambers 31 and 32 communicate with each other through the communicating gap 40. A plurality of communicating holes 42 which communicate with the second liquid chamber 32 and the communicating gap 40 are formed in the base portion 37b.

Thus, when the shock absorber is operated, that is, as the hollow rod 12 moves on a right side relatively to the outer cylindrical body 13 in FIG. 4, the number of the orifices 41 blocked by the annular piston 30 increases. Namely, the number of the orifices 41 which communicate with the first liquid chamber 31 and the second liquid chamber 32 through the communicating gap 40 decreases. Consequently, in the case where the shock absorber 10b is operated, in a process in which the outer cylindrical body 13 moves toward the left end portion side of the hollow rod 12 relatively against the spring force, the entire areas of the orifices which communicate with the two liquid chambers 31 and 32 decrease gradually as the outer cylindrical body 13 moves toward the left end portion side of the hollow rod 12. That is, when the shock absorber 10b is operated, the resistance force is increased gradually as the outer cylindrical body 13 is moved relatively to the hollow rod 12. Incidentally, although the orifices 41 are formed by circular through holes, they may be formed by a single or plural slits extending axially.

In the annular piston 30, a guide hole 43 which communicates with the two liquid chambers 31 and 32 is formed. The guide hole 43 is provided with a check valve 44, which closes the guide hole 43 to prevent the flow of the liquid L from the first liquid chamber 31 to the second liquid chamber 32 when the outer cylindrical body 13 moves relatively to the left end portion side of the hollow rod 12 during an operation of the shock absorber. To the contrary, the check valve 44 opens the guide hole 43 to allow the flow of the liquid L from the second liquid chamber 32 to the first liquid chamber 31 when the outer cylindrical body 13 is moved relatively to the right end portion side of the hollow rod 12. Thus, the resistance force applied to a flow of the liquid from the first liquid chamber 31 to the second liquid chamber 32 when the hollow rod 12 absorbs the impact force and moves by an operation of the shock absorber 10b becomes larger than that applied to the flow of the liquid from the second liquid chamber 32 to the first liquid chamber 31 when the hollow rod 12 is restored to its original position. When the shock absorber 10b becomes in the inoperative condition, the hollow rod 12 and the outer cylindrical body 13 are immediately returned to their original positions by a force of the compression coil spring.

In the shock absorber 10c shown in FIG. 5, an accumulator 45 is incorporated in the second liquid chamber 32. This shock absorber 10c has the same structure as the shock absorber 10a shown in FIGS. 1 and 2 except that the accumulator 45 is incorporated therein.

In the shock absorber 10d shown in FIG. 6, the annular piston 30 is provided integrally outside the hollow rod 12 similarly to the shock absorber 10b shown in FIG. 4, and the gap 34 is formed between the annular piston 30 and the outer cylindrical body 13, and the guide hole 43 for communicating with the two liquid chambers 31 and 32 is formed in the annular piston 30. When the outer cylindrical body 13 is moved relatively to the left end portion of the hollow rod 12 during the operation of the shock absorber 10d, the guide hole 43 is closed and the flow of the liquid from the first liquid chamber 31 to the second liquid chamber 32 is prevented. To the contrary, when the outer cylindrical body 13 is moved relatively to the right end portion of the hollow rod 12, the guide hole 43 is opened and a check valve 44 for permitting the flow of the liquid L from the second liquid chamber 32 to the first liquid chamber 31 is provided in the guide hole 43.

Incidentally, although each check valve 44 in FIGS. 4 and 6 is formed of a spherical member, it may be formed of a needle-like member and the number of the guide holes 43 may be singular or plural. Further, the annular piston 30 of the shock absorber 10a shown in FIGS. 1 and 2 may be provided integrally outside the hollow rod 12 or may be provided with the guide hole 43 and the check valve 44 in the same manner as FIG. 4.

Figure 7:
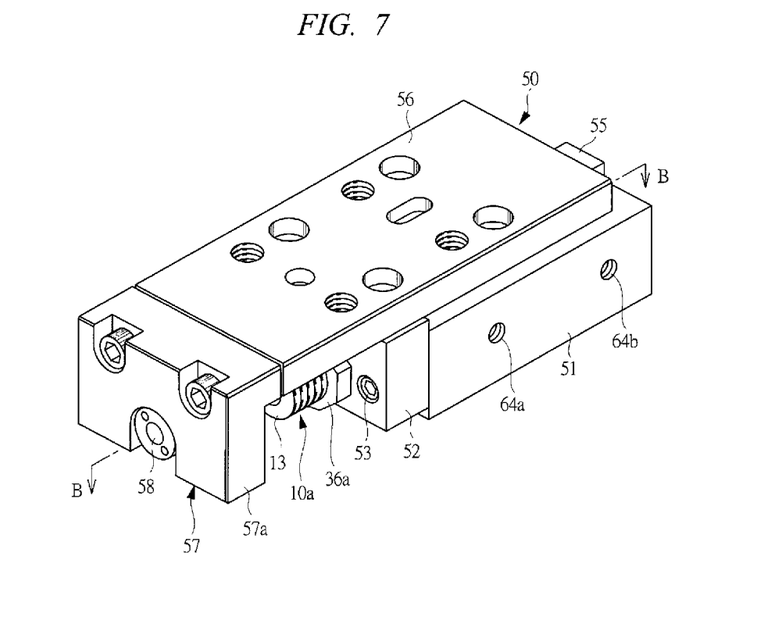
FIG. 7 is a perspective view showing a pneumatic cylinder as a reciprocating unit on which the shock absorber shown in FIGS. 1 and 2 is mounted.
Figure 8:
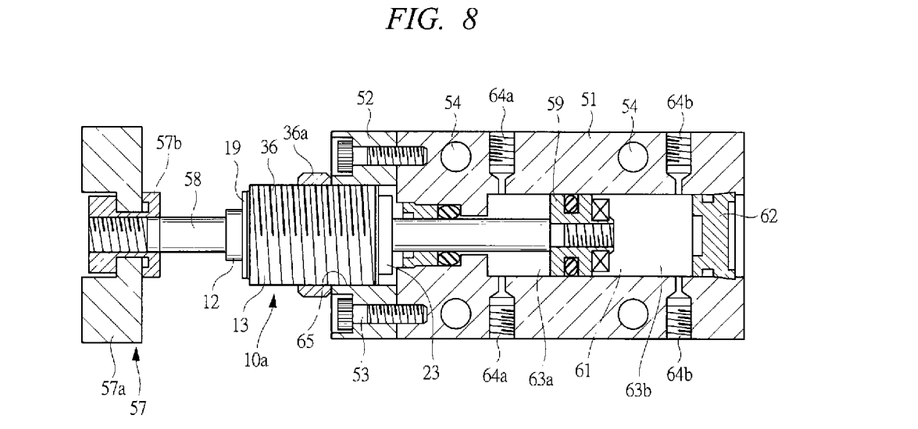
FIG. 8 is a sectional view taken along line B-B in FIG. 7.

FIG. 7 is a perspective view showing a pneumatic cylinder 50 as a reciprocating unit on which the shock absorber 10a shown in FIGS. 1 and 2 is mounted. FIG. 8 is a sectional view taken along line B-B of FIG. 7.

This pneumatic cylinder 50 includes a cylinder main body comprising a substantially rectangular parallelepiped cylinder block 51 and a cover member 52 fixed to a tip face thereof, and a reciprocating unit main body is constituted by this cylinder main body. The cover member 52 is fixed to the cylinder block 51 by screw members 53, and the cylinder main body is fixed to a supporting base etc. by a screw member (not shown) to be attached to an attaching hole 54 formed in the cylinder block 51.

A guide rail 55 is fixed as shown in FIG. 7 longitudinally and on a width-directional central portion of a surface of the cylinder block 51. A reciprocating table i.e., a slide table 56 is mounted reciprocably linearly along this guide rail 55. A linking block 57a is fixed to a tip portion of the slide table 56. Assume that a leftward movement of the slide table 56 as shown in FIGS. 7 and 8 is a forward movement and a movement opposite thereto is a backward movement. A reciprocating rod 58 is provided reciprocably in the cylinder block 51, and a tip of the reciprocating rod 58 is fixed to the linking block 57a by attaching nut 57b. A piston 59 fixed to a rear end portion of the reciprocating rod 58 is reciprocable in a cylinder chamber 61 formed in the cylinder block 51, and a rear end portion of the cylinder chamber 61 is blocked by a cover member 62.

The cylinder chamber 61 is partitioned into two pressure chambers 63a and 63b by the piston 59, and supply/discharge ports 64a and 64b are formed in the cylinder block 51 so as to communicate with the respective pressure chambers 63a and 63b. Although the supply/discharge ports 64a and 64b are formed on both side faces of the cylinder block 51, the supply/discharge ports 64a and 64b located on one of the side faces may be used depending on an attaching position of the pneumatic cylinder 50 while the supply/discharge ports located on the other are not used and are blocked with a dosing member. When compressed air is supplied to the supply/discharge port 64a, the reciprocating rod 58 is moved backward and when the compressed air is supplied to the supply/discharge port 64b, the reciprocating rod 58 is moved forward.

A female screw 65 as shown in FIG. 8 is formed in a through hole formed in the cover member 52. Under the condition in which the reciprocating rod 58 passes through the through hole 11 of the hollow rod 12 of the shock absorber 10a, the male screw 36 of the outer cylindrical body 13 is screwed to the female screw 65 and simultaneously the nut 36a is fastened to the cover member 52, so that the shock absorber 10a is attached to the cylinder main body through the outer cylindrical body 13.

As shown in FIG. 8, when the shock absorber 10a is in the inoperative condition, a projection end portion of the hollow rod 12 protrudes in an outer axial direction from the flange 19 of the plug 18. If, under this condition, the reciprocating rod 58 is moved backward by supplying the compressed air to the supply/discharge port 64a, the colliding member 57 collides with the end face of the hollow rod 12 and thereafter moves until the colliding member 57 abuts on the flange 19. In a movement process from this collision to a stop, while the compression coil spring 28 of the shock absorber 10a is contracted as shown in FIGS. 1 and 2, the liquid L flows from the first liquid chamber 31 into the second liquid chamber 32 through the gap 34, whereby a resistance force is applied to the annular piston 30. Consequently, the impact forces of the slide table 56, the linking block 57, and the reciprocating rod 58 as moving members are absorbed. Incidentally, the shock absorbers 10b and 10c shown in FIGS. 4 and 5 can also be mounted on the pneumatic cylinders shown in FIGS. 7 and 8.

Figure 9A:
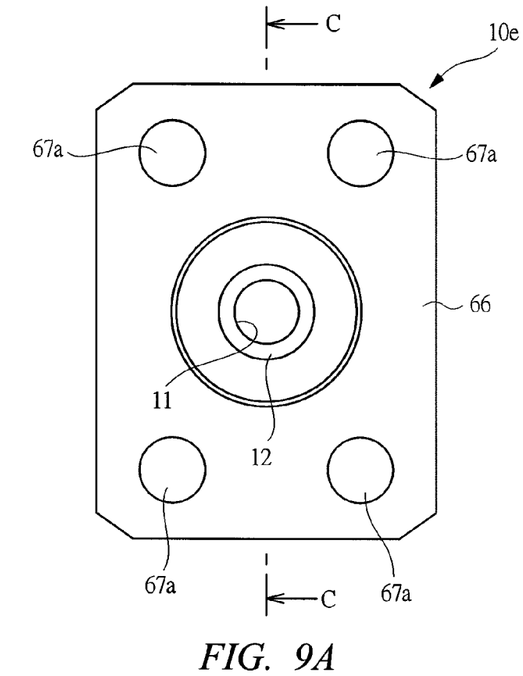
FIG. 9A is a front view showing a shock absorber according to another embodiment of the present invention.
Figure 9B:
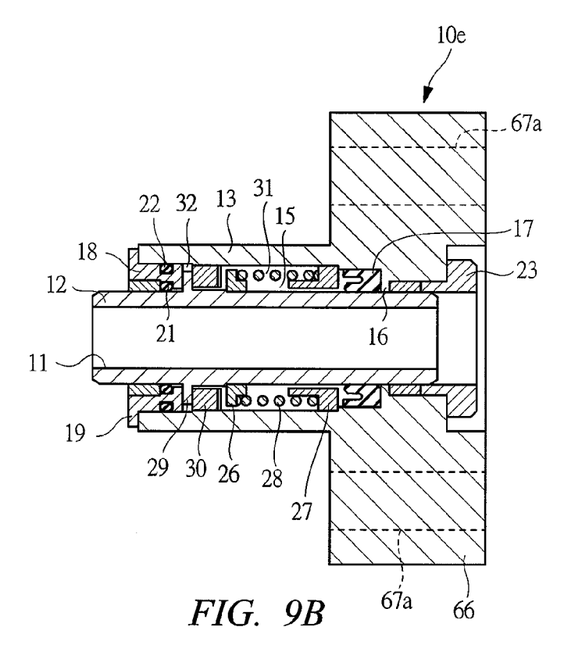
FIG. 9B is a sectional view taken along line C-C in FIG. 9A.
Figure 10:
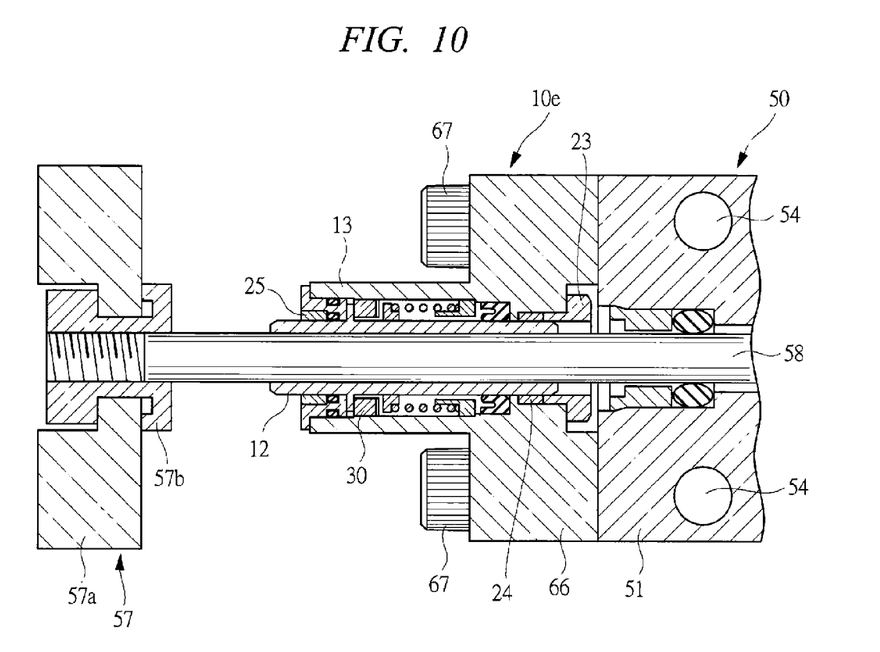
FIG. 10 is a sectional view showing a state of attaching the shock absorber shown in FIG. 9 to the reciprocating unit.

FIG. 9A is a front view showing a shock absorber 10e according to another embodiment of the present invention, FIG. 9B is a sectional view taken along line C-C in FIG. 9A, and FIG. 10 is a sectional view showing a state in which the shock absorber 10e shown in FIGS. 9A and 9B is attached to a reciprocating unit. A basic structure of the shock absorber 10e is the same as that shown in FIGS. 1 and 2. In FIG. 9, members having functions common to the member shown in FIG. 1 are denoted by the same reference numerals.

As shown in FIG. 9B, a front square bracket 66 is provided integrally with the outer cylindrical body 13, and the shock absorber 10d is attached to the reciprocating unit through this bracket 66. The bracket 66 is provided with attaching holes 67a through which screw members 67 pass. The outer circumferential face of the outer cylindrical body 13 is not provided with the male screw 36 shown in FIG. 1.

A basic structure of the pneumatic cylinder 50 as a reciprocating unit shown in FIG. 10 is the same as that shown in FIGS. 7 and 8. FIG. 10 shows the cylinder block 51 and the linking block 57a in the pneumatic cylinder 50 shown in FIG. 8. The bracket 66 shown in FIG. 9 functions as the cover member 52 of the pneumatic cylinder 50 shown in FIGS. 7 and 8. By fixing the bracket 66 to the cylinder block 51 by the screw members 67 under the condition in which the reciprocating rod 58 passes through the through hole 11 of the hollow rod 12, the bracket 66 constitutes a part of the cylinder block 50 and the outer cylindrical body 13 is fixed directly to the cylinder block 51 through the bracket 66.

The shock absorber 10e of this type is attached directly to the pneumatic cylinder 50 through the bracket 66 serving as a cover member. Therefore, similarly to the cases shown in FIGS. 7 and 8, the impact force is decreased until the colliding member 57 collides with the end face of the hollow rod 12, then contacts with the outer cylindrical body 13 through the flange 19, and is stopped.

As described above, in the shock absorber of the present invention, the hollow rod 12 and the outer cylindrical body 13 mounted coaxially with the outside thereof are movable axially relatively to each other, and the hollow rod 12 is fitted slidably relatively to the reciprocating rod 58 of the pneumatic cylinder, and the outer cylindrical body 13 is attached to the cylinder main body. Therefore, when the shock absorber is operated, that is, absorbs the impact force, no load in a direction of inclining the reciprocating rod is applied to the pneumatic cylinder serving as a reciprocating unit, so that no bending moment is applied to the reciprocating rod, thereby making it possible to improve durability of the reciprocating unit. Further, it is unnecessary to provide the reciprocating unit with a fixing jig or stopper for attaching the shock absorber, so that it is not required to secure a space for attaching the fixing jig etc. around the reciprocating unit and it is possible to reduce the manufacture cost of the reciprocating unit.

The present invention is not limited to the above-described embodiments and may be variously modified and varied within a range not departing from the gist of the invention. For example, FIGS. 7 and 8 show the pneumatic cylinder equipped with the shock absorber. However, the shock absorber of the present invention can be applied to not only a pneumatic cylinder but also a hydraulic cylinder which uses hydraulic pressure as a drive medium as long as it is a unit capable of reciprocating any rods. As another example, shown in FIG. 12, the embodiments of FIGS. 4 and 5 can be essentially combined to provide a shock absorber 10f possessing the structural features and functional advantages of both embodiments 10b and 10c. The shock absorber 10f shown in FIG. 12 combines an integral annular piston 30, similar to the shock absorber 10b shown in FIG. 4, with a liquid accumulator 45, similar to the shock absorber 10c shown in FIG. 5.

Figure 12:
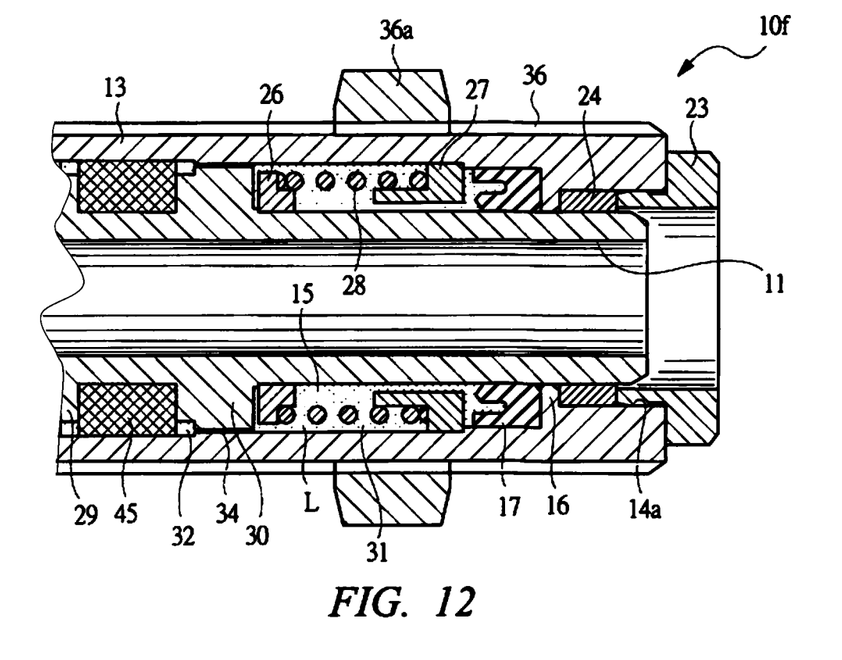
FIG. 12 is a section view showing a shock absorber according to another embodiment of the present invention.

Still referring to FIG. 12, at a time when the shock absorber 10f is operated to absorb impact, a colliding body (not shown) exerts a collision force against the hollow rod 12 toward the outer cylindrical body 13. The compression coil spring 28 opposes the collision force while the integral annular piston 30 applies a resistance force to the flow of liquid L from the first liquid chamber 31 through the gap 34 and into the second liquid chamber 32 housing the accumulator 45. By contrast, when the shock absorber 10f is released, the compression coil spring 28 restores the original relation of the hollow rod 12 within the outer cylindrical body 13, while the liquid L flows from the second liquid chamber 32 around the integral annular piston 30 and into the first liquid chamber 31.

What is claimed is:

1. A shock absorber used for decreasing an impact force at a time of stopping a reciprocating unit main body having a reciprocating rod incorporated therein, the reciprocating unit main body also having a cylinder chamber formed therein, wherein the cylinder chamber is partitioned into two pressure chambers by a piston fixed to one end of the reciprocating rod, the shock absorber comprising:

an outer cylindrical body attached to the reciprocating unit main body, both end portions of the outer cylindrical body being formed with respective openings;

a hollow rod having a through hole opened toward each opening of the outer cylindrical body, the hollow rod being mounted inside and coaxially with the outer cylindrical body so as to be axially movable relatively to the outer cylindrical body, and moving axially with the reciprocating rod within the outer cylindrical body at a time of decreasing the impact force, wherein the reciprocating rod is inserted in the through hole so as to protrude from each end of the through hole, and so as to protrude from each opening of the outer cylindrical body;

an annular piston provided outside the hollow rod, partitioning a liquid accommodating space into a first liquid chamber and a second liquid chamber formed between the hollow rod and the outer cylindrical body, and applying a resistance force to a flow of the liquid from the first liquid chamber to the second liquid chamber at a time of an impact-force absorption movement of the hollow rod; and a spring provided in the first liquid chamber for restoring the hollow rod, after an impact-force absorption, to an original position, the spring extending between a first spring receiver provided on the hollow rod and a second spring receiver provided on the outer cylindrical body, wherein the hollow rod is coaxial with the reciprocating rod and with the cylindrical chamber of the reciprocating unit main body.

2. The shock absorber according to claim 1, wherein under an operative completion condition of the shock absorber, the outer cylindrical body abuts on a colliding member provided in the reciprocating unit main body.

* * * * *